(No Model.)

S. P. BARNARD.
EDUCATIONAL APPLIANCE.

No. 560,964. Patented May 26, 1896.

Witnesses.

Inventor.
Sadie P. Barnard

Attorneys

UNITED STATES PATENT OFFICE.

SADIE P. BARNARD, OF ROCHESTER, NEW YORK.

EDUCATIONAL APPLIANCE.

SPECIFICATION forming part of Letters Patent No. 560,964, dated May 26, 1896.

Application filed March 27, 1896. Serial No. 585,076. (No model.)

*To all whom it may concern:*

Be it known that I, SADIE P. BARNARD, of Rochester, in the county of Monroe and State of New York, have invented certain new and useful Improvements in Educational Appliances; and I do hereby declare the following to be a full, clear, and exact description of the same, reference being had to the accompanying drawings, forming a part of this specification, and to the reference letters and numerals and colors marked thereon.

The experience of kindergarten teachers has demonstrated that the attention of the children is more concentrated and can be retained longer and with less mental fatigue to the pupils when they are sewing with a needle and thread or worsted because of their interest in this their favorite occupation, and the plan of requiring them to work on perforated cardboard (letters marked thereon) has been utilized to familiarize them with the structure or shape of letters or figures, but great difficulty has been encountered in teaching young children especially the values of numerals;
and it is therefore the object of my invention to produce an appliance or device for teaching children the values of numerals by the association of the numerals or figures with colored pictorial representations of objects or letters in quantity equal to the numerals, and to retain their attention and impress upon their minds the shape of the numerals by causing them to sew or work them on cardboard or a similar support. It is further necessary, in order that elementary arithmetic may be taught, that the children have some familiarity with the ordinary algebraic signs, as follows: $+$, $-$, $\times$, $\div$, and $=$, and that the relations that different numbers of objects (and also the numerals representing them) bear to each other be indicated by said algebraic signs, the use of the latter being practically essential to the apparatus used by me in teaching. As much time has to be spent both in teaching and learning the letters of the alphabet, and in teaching and learning the science of color, letters, groups, and combinations of letters are used in connection with the numerals, so that they may be learned at the same time, and by coloring the objects pictorially represented and selecting such objects for the first six cards of the series as embody the six standard colors—red, orange, yellow, green, blue, and violet—and by coloring the succeeding letters used in place of the objects, but in the same manner, so that in sewing the numerals in connection with them the tints and shades are used, a true foundation in the science of color is laid in the mind of each child. Thus this device used for teaching numbers, the alphabet, and color, though manual work, makes necessary practical work interesting and saves time by facilitating the teaching and learning of three branches, to say nothing of the skill and knowledge gained through the manual work performed.

To these ends my invention consists of a card or similar surface having colored pictorial representations thereon of objects or groups of objects, letters or groups of letters with algebraic signs between them, and a series of numerals stamped or printed upon said surface indicating the number of objects or letters corresponding in position and having corresponding algebraic signs between them, the said numerals being provided with perforating indications, so that when thread or yarn is drawn through the perforations indicated the portion on the face of the card or support will follow the lines of the figure or sign.

In the accompanying drawings is shown a card marked in accordance with my invention, the letter A indicating the card, upon which is stamped, lithographed, or printed the pictorial representation of an apple B, a second apple B', with the plus sign between them, and the representation of two apples $B^2$, an equality sign being placed between them and the apple B'. Beneath the picture of the apple B is stamped or printed the numeral "1," preferably in light outline, with a number of dots $a$ on its surface indicating the places where the pupil should insert the needle in order to lay the thread or worsted to properly outline the figure. In similar manner the plus and equality signs and the numerals "1" and "2" beneath the pictures of apples B' and $B^2$ are outlined and the similar dots $a$ marked thereon indicating the places for perforating. I have shown two other simple problems $2+1=3$ and $3+1=4$ on the same card, and also a problem involving letters, each one being associated with the pictorial representations of a corresponding number of objects. I find in practice that by the use of cards such as shown the pupils readily learn that the characters they work with the needle indicate the numeral representing the quantity or number of objects above it, and in this way by carrying out the system on a number of cards having pictures and numerals and following this general line the work of teaching and learning is greatly facilitated.

It will be understood that the pictures B B' B² may be of any other objects desired, but are preferably common things, as apples, oranges, lemons, &c., and also that instead of merely printing the dots $a$ on the figures or numerals to be worked by the pupil perforations could be formed at these points; but this would be much more expensive and would deprive the pupil of beneficial work, for in perforating and sewing the outlines of each figure are followed several times, and children learn by doing things repeatedly.

I claim as my invention—

1. As an educational appliance for teaching numbers, a card or similar surface capable of being punctured, and having pictorial representations of objects and groups of objects thereon with algebraic signs between them, and a series of numerals stamped or printed thereon indicating the number of the objects pictorially represented corresponding in position and having corresponding algebraic signs between them, said numerals being provided with perforating indications marked thereon, so that threads drawn through them will follow the lines of the numerals, substantially as and for the purpose specified.

2. As an educational appliance for teaching numbers, alphabet and color by associating manual work with mental, a card or similar surface capable of being punctured and having colored pictorial representatious of objects or groups of objects, letters or groups of letters thereon, with algebraic signs between them, and a series of numerals stamped or printed thereon indicating the number of objects or letters pictorially represented, corresponding in position, and having corresponding algebraic signs between them, said numerals being provided with dots marked thereon indicating perforations so that threads drawn through them will follow the lines of the numerals, substantially as and for the purpose specified.

SADIE P. BARNARD.

Witnesses:
F. F. CHURCH,
G. W. RICH.